(12) United States Patent
Rittmann

(10) Patent No.: US 12,717,127 B2
(45) Date of Patent: Aug. 25, 2026

(54) PORTABLE OPTICAL OBSERVATION DEVICE

(71) Applicant: Carl Zeiss AG, Oberkochen (DE)

(72) Inventor: Thomas Rittmann, Rainau-Buch (DE)

(73) Assignee: Carl Zeiss AG, Oberkochen (DE)

( * ) Notice: Subject to any disclaimer, the term of this patent is extended or adjusted under 35 U.S.C. 154(b) by 450 days.

(21) Appl. No.: 18/201,736

(22) Filed: May 24, 2023

(65) Prior Publication Data

US 2023/0384578 A1 Nov. 30, 2023

(30) Foreign Application Priority Data

May 24, 2022 (DE) ..................... 10 2022 205 197.1

(51) Int. Cl.
*G02B 23/18* (2006.01)

(52) U.S. Cl.
CPC .................................... *G02B 23/18* (2013.01)

(58) Field of Classification Search
None
See application file for complete search history.

(56) References Cited

U.S. PATENT DOCUMENTS 5,583,693 A 12/1996 Funatsu
2005/0237613 A1* 10/2005 Yamanouchi .......... G02B 23/18 359/507
2020/0127245 A1* 4/2020 Fan .................. H01M 10/0436
2022/0317548 A1 10/2022 Sun et al.

FOREIGN PATENT DOCUMENTS

CN 201355404 Y 12/2009
CN 210638688 U 5/2020
DE 4244161 A1 7/1993
DE 202021103531 U1 10/2021
JP 2016154155 A 8/2016

OTHER PUBLICATIONS

Office Action issued in German Patent Application No. DE 10 2022 205 197.1, dated Jan. 30, 2023 (from which this application claims priority) and English language translation thereof.

* cited by examiner

*Primary Examiner* — Paisley L Wilson
(74) *Attorney, Agent, or Firm* — Ewers IP Law PLLC; Falk Ewers

(57) ABSTRACT

A portable optical observation device is provided. The portable optical observation device includes an optical group which has a plurality of optical elements arranged in distributed fashion along an optical axis, and a housing which surrounds the optical group at least radially around the optical axis. Moreover, the observation device includes at least one electronic assembly and at least one planar battery cell which is shaped against the housing, configured to be at least moisture resistant, and configured to supply the electronic assembly with power.

14 Claims, 2 Drawing Sheets

PORTABLE OPTICAL OBSERVATION DEVICE

CROSS REFERENCE TO RELATED APPLICATIONS

This application claims priority to German patent application DE 10 2022 205 197.1, filed May 24, 2022, the entire content of which is incorporated herein by reference.

TECHNICAL FIELD

The disclosure relates to a portable optical observation device.

BACKGROUND

Optical observation devices are used during observation of nature and animals and (e.g., also in association therewith) also during hunting. Such observation devices are often binoculars or spotting scopes (the latter are commonly also referred to as "telescopes"). It is conventional for such observation devices to include an optical assembly (referred to as "objective group" or "optical group" below), with the optical assembly having in turn a plurality of optical elements (usually a plurality of optical elements)—which optionally are mirrors but usually are lens elements and possibly also prisms. In this context, these optical elements are arranged in succession along an optical axis, or else in the direction of passing radiation. The objective group serves for magnification and imaging—usually also unreversed imaging—of the observation region. The objective group frequently also contains at least one movably arranged optical element which serves for focusing.

Depending on the field of use, modern optical observation devices also contain electronic components. For example, (laser) rangefinders are frequently integrated into binoculars, spotting scopes and/or telescopic sights made for hunting. Moreover, image stabilizers are also known and advantageous for hand-guided observation devices with comparatively large magnifications in particular.

However, electronic components require a power supply, which is typically implemented without cables and hence linked to batteries. However, it is acknowledged that there is hardly any installation space available for housing batteries in conventional binoculars or spotting scopes if an increase in the dimensions already required on account of the optical unit is to be avoided.

SUMMARY

It is an object of the disclosure to provide an optical observation device that has been improved in terms of a power supply for an electronic component.

The object is achieved by a portable observation device as described herein.

The portable optical observation device according to an aspect of the disclosure includes an optical group which has a number of optical elements, typically a plurality of optical elements, arranged in a distributed fashion along an optical axis (the latter also being referred to as "beam path" or "direction of passing radiation"). Moreover, the observation device includes a housing which surrounds the optical group at least radially around the optical axis. At least portions of the housing are typically approximately tubular and said housing has a light entrance opening and a light exit opening. Further, the observation device includes an electronic assembly and at least one planar, typically flat, battery cell. In this case, the battery cell is shaped against the housing, configured to be at least moisture resistant and to supply the electronic assembly with power.

Here and hereinafter, optical elements are understood to mean elements with a refractive and/or reflective (optionally also diffractive) effect, i.e., lens elements, mirrors, prisms (or optionally diffractive optical elements), and the like.

Here and hereinafter, "portable" is understood to mean that the observation device can be held and manipulated by a person using one hand, optionally using two hands. Here and hereinafter, "planar" and "flat" are understood to mean that the corresponding element—which is to say the battery cell here in any case—has larger dimensions in a plane than in a direction perpendicular thereto, i.e., it is many times wider and longer (in particular at least by a factor of 3) than it is thick. Typically, the battery cell has a film-type embodiment and a thickness ranging from 0.5 to 7 mm. Typically, the battery cell has a capacity of approximately 500 to 20,000° mAh.

In this context, the use of such a flat and moisture-resistant battery cell within the scope of the observation device is advantageous in that the battery cell requires only a small installation space on account of being shaped against the housing or on account of following the shape of the housing, and on account of the flat structure, with the result that the housing or the external geometry of the observation device requires no additional structures or only insubstantial additional structures in comparison with an embodiment without an electronic assembly. Expressed differently, the housing can be kept comparatively small, even if an electronic assembly is used.

Typically, the disclosure also relates to the use of such a flat and moisture-resistant battery cell with an observation device of the type described here and hereinafter.

The battery cell is flexible according to an exemplary embodiment. In particular, this is understood to mean that the battery cell is elastically and reversibly deformable. In this context, the battery cell is typically reversibly deformable by approximately 80%, for example 100% or even up to 120%. By way of example, the battery cell is stretchable to more than twice the length (in relation to the length in the final manufacturing state), and/or bendable and/or twistable through approximately 180 degrees. As a result, the battery cell can be adapted particularly easily to the available installation space and also be fitted particularly tightly against the housing.

In a further exemplary embodiment, the battery cell is not only moisture resistant but also washable. Here, "washable" is typically understood to mean that the battery cell is resistant to, in particular sealed against, adjacent fluids, for example water, and also resistant to wash liquors and the like. This allows the battery cell to be used in an outer region of the housing which is optionally not subject to the same stringent sealing requirements as a housing interior in which the objective assembly is arranged. Moreover, correspondingly complex sealing can also be dispensed with or restricted just to cable bushings into the housing. The above-described washability advantageously also enables resistance against sweat or else cleaners which may be used when cleaning the observation device following use in "harsh" surroundings (e.g., after contact with mud or the like).

Typically, the battery cell is also used externally on the housing, which is to say it is typically applied externally to the housing.

Typically, the battery cell also has a shock-resistant embodiment.

In an advantageous development of the battery cell applied externally to the housing, said battery cell is covered by a sheathing applied to the housing. In particular, such a sheathing is a type of housing casing which at least partly covers the housing and serves to make gripping the observation device easier, serves to enable protection against shocks, serves to avoid "rattling" when the observation device bumps into other objects, and the like.

In an exemplary embodiment that is advantageous in regard to replacement, maintenance, or the like, the battery cell is arranged in a battery compartment which is introduced into the housing radially on the outside (in particular as seen vis-à-vis the optical group) and which in particular is flat (i.e., with a typically small "installation height" in comparison with the thickness of the housing wall) and planar (typically adapted to match the dimensions of the battery cell). For example, the battery compartment forms a depression in the housing. Alternatively, the battery cell may also be arranged behind (i.e., adjoining) an external step in the housing, for example a circumferential shoulder or the like, and in particular be arranged in the "shadow" of the step or in alignment therewith. In this case, the battery cell—in particular having been inserted into the battery compartment—is typically covered by a housing subcomponent or a sheathing subcomponent. Thus, the housing or sheathing subcomponent forms a cover for the battery cell in particular. No battery compartment is provided in the housing in an optional variant in which the battery cell is covered with the sheathing subcomponent, which is to say the battery cell is applied externally to the housing. However, the battery cell is comparatively easily accessible in any case by way of removal of this cover.

The housing subcomponent or the sheathing subcomponent is typically formed with a rapid manufacturing method.

In this context, the housing subcomponent or the sheathing subcomponent is typically produced with laser beam melting, laser beam sintering, laser beam build-up welding, electron beam melting, stereolithography, digital light processing, multi-jet modeling (or poly-jet modeling), fused deposition modeling, binder jetting, cold spray or the like.

Further typically, the housing subcomponent or the sheathing subcomponent is held on the housing or the sheathing so as to be reversibly (in particular non-destructively) openable and closable.

In an exemplary embodiment, the observation device includes at least two of the above-described battery cells. These are configured and provided for the redundant power supply of the electronic assembly.

By way of example, the observation device forms a pair of binoculars. In this case, the electronic assembly is embodied as an image stabilizer—but typically also independently of the specific structure of the observation device. Additionally or as an alternative, the electronic assembly is embodied as a sensor system for position (e.g., GPS and the like), for pose and/or acceleration, as a rangefinder, as illumination (e.g., for a reticle or the like), as a display, as a processor (e.g., in the form of a microprocessor, ASIC, FPGA), as an actuator (e.g. for a zoom or focus adjustment), and the like.

The battery cell or each battery cell is typically configured as a secondary cell, which is to say as a rechargeable battery cell (also referred to as an accumulator). By way of example, such a secondary cell is embodied as a lithium-ion cell, a lithium polymer cell or a similar cell. In this case, charging is typically implemented with a charging interface arranged on the housing (e.g., pursuant to the USB-C standard, a type of jack or the like, optionally also by induction). Such a charging interface (in particular an isolated charging interface) is optionally likewise reversibly covered by the aforementioned housing or sheathing subcomponent. Alternatively, the battery cell may also be in the form of a primary cell, which is to say in the form of a non-rechargeable battery cell.

Here and hereinafter, the expression "and/or" should be understood to mean in particular that the features linked by this expression can be embodied both jointly and as alternatives relative to one another.

BRIEF DESCRIPTION OF THE DRAWINGS

The disclosure will now be described with reference to the drawings wherein.

DESCRIPTION OF EXEMPLARY EMBODIMENTS

Mutually corresponding parts are provided with the same reference signs throughout the figures.

Figure 1:
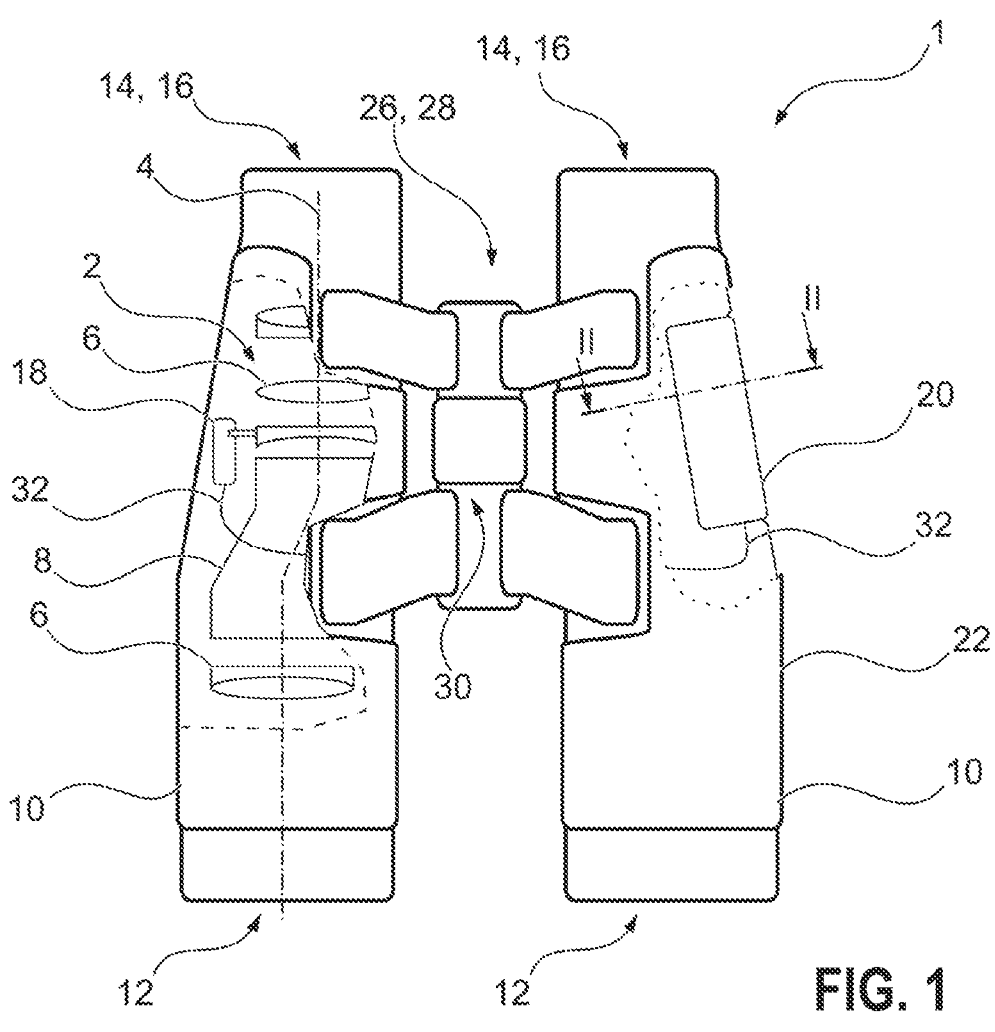
FIG. 1 shows an optical observation device in a schematic and partly cut-away representation.

FIG. 1 schematically illustrates a portable, optical observation device in the form of a pair of binoculars 1. The binoculars 1 have an optical group 2 for each eye, with each optical group having a plurality of optical elements arranged in a distributed fashion along an optical axis 4. The optical elements are formed by a plurality of lens elements 6 made of optical glasses and—in the present exemplary embodiment—by one prism 8. Each optical group 2 is cladded radially with respect to the optical axis 4 and in tubular fashion by a respective partial housing body 10, the latter protecting its optical group from contamination (at least against an ingress between the lens elements 6) and from mechanical influences. In this case, each partial housing body 10 is part of an (overall) housing not denoted in any more detail. In the present example, the optical axis 4 is angled and sketches out a beam path from an entrance opening 12 to an exit opening 14 (which is formed at a respective eyepiece 16).

Moreover, the binoculars 1 include an electronic assembly. The latter forms an image stabilizer 18 in the present exemplary embodiment. Said image stabilizer includes a drive acting on at least one lens element 6—in the present exemplary embodiment—in order to be able to compensate for at least minor movements of the binoculars 1 and thereby to compensate for a certain amount of blurring due to motion. Moreover, the binoculars 1 include a rechargeable battery cell 20 for supplying the image stabilizer 18 with power.

Figure 2:
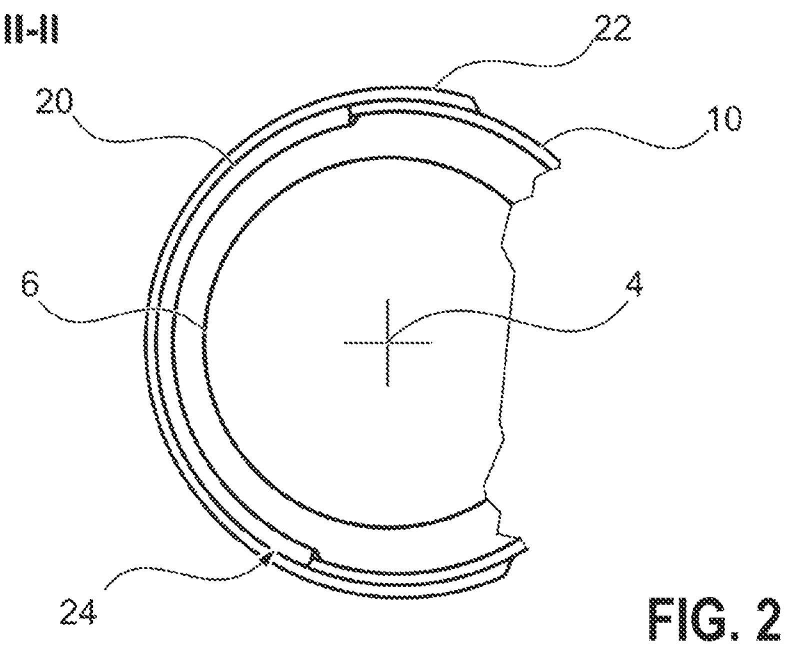
FIG. 2 shows the observation device in a schematic sectional view II-II in accordance with FIG. 1.

Said battery cell is embodied to be film-like, which is to say comparatively thin and planar, and it is flexible, which is to say elastically bendable, is arranged externally on the partial housing body 10 and is shaped against the partial housing body 10, which is to say it nestles against the external contour of the partial housing body 10 (see FIG. 2). Moreover, the battery cell 20 has a water resistant and washable embodiment.

Moreover, the binoculars 1 have a protective sleeve, referred to here and hereinafter as "sheathing 22", for each of the partial housing bodies 10. The sheathing surrounds large parts of the respective partial housing body 10 (in particular more than 60 percent of the external surface of the partial housing body 10) and serves to increase the grip and serves as a damping layer. The battery cell 20 is applied to the partial housing body 10 below this sheathing 22, specifically inserted into a depression 24—visible in FIG. 2—of the partial housing body 10.

In a variant not illustrated in any more detail, the partial housing body 10 does not have a depression 24 for the battery cell 20. Optionally, the sheathing 22 has a comparable depression on its inner side—in particular depending on the thickness of the battery cell 20—in this case, and so the battery cell 20 causes no displacement (for example, bulging) of the sheathing 22 toward the external side of the sheathing 22.

The two partial housing bodies 10 are coupled to one another with what is known as a "hinge bridge 26". In this case, the hinge bridge 26 is likewise part of the (overall) housing. Moreover, the hinge bridge 26 has a hinge 28, about which the two partial housing bodies 10 can be pivoted relative to one another for the purpose of adjusting a distance between the two eyepieces 16. Moreover, an adjustment mechanism 30 which allows focusing is arranged on the hinge 28.

By way of a cable connection 32, the battery cell 20 is connected to the image stabilizer 18 (or optionally to a distribution interface for distributing power among a plurality of electronic assemblies possibly present). In this case, the cable connection 32 is guided in media-tight fashion into the partial housing body 10 at a suitable location, for example in the region of the hinge bridge 26.

A battery cell 20 is arranged on only one of the two partial housing bodies 10 in an optional variant. The image stabilizer 18 assigned to the other optical group 2 is supplied with power via the hinge bridge 26 in a manner not illustrated here.

In a further variant, (at least) one battery cell 20 is arranged on each of the two partial housing bodies 10. In this case, each battery cell 20 serves to supply power to the respective image stabilizer 18 and/or serves as redundancy should one of the battery cells 20 be discharged or malfunction.

Figure 3:
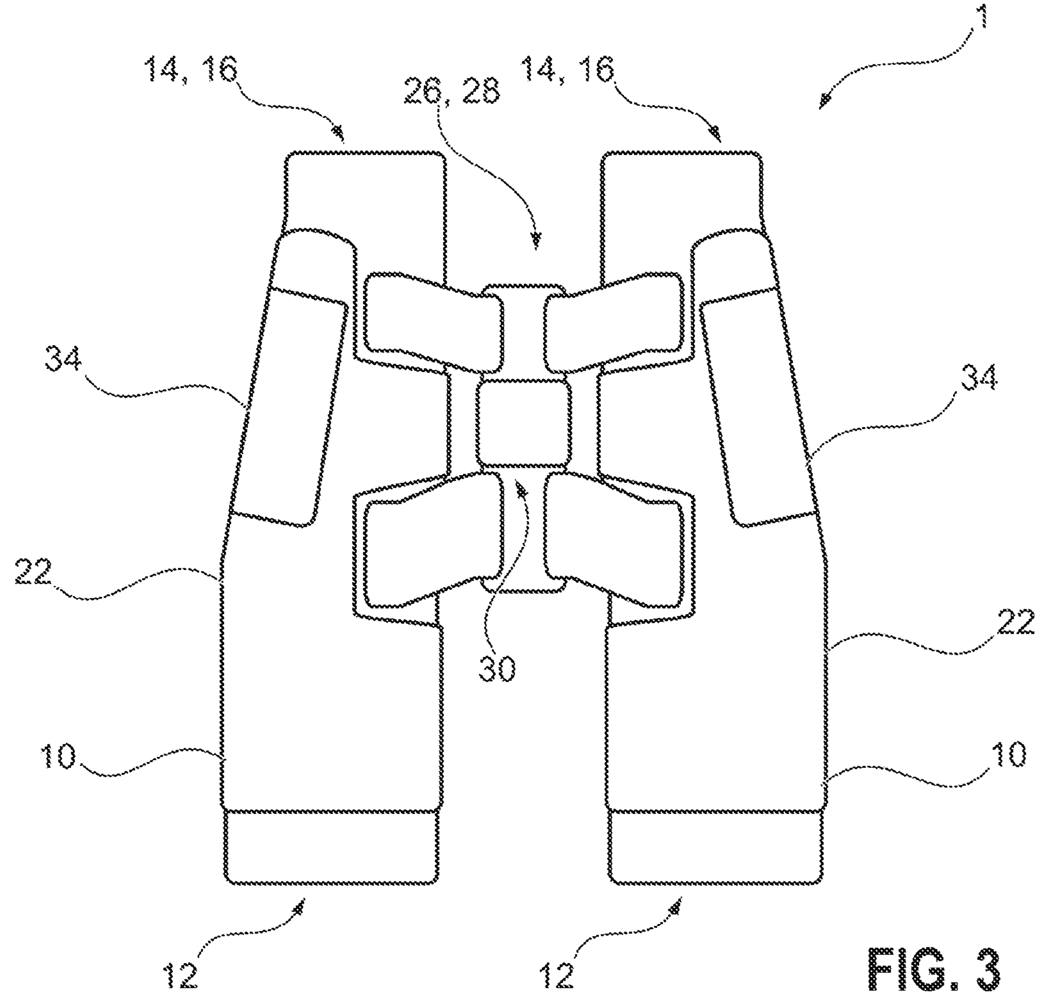
FIG. 3 shows a view in accordance with FIG. 1 of a further exemplary embodiment of the observation device.

FIG. 3 schematically illustrates a further exemplary embodiment. To simplify maintenance or exchange of the battery cell 20, the sheathing 22 has a cutout (also referred to as a "window").

The latter is covered with a cover 34, which forms a subcomponent of the sheathing 22, and is reversibly sealed, for example with a snap-lock connection. This exemplary embodiment is particularly advantageous for the case where the sheathing 22 has been applied by injection molding, and hence not in non-destructively releasable fashion, to the respective partial housing body 10. Optionally, this cover 34 is produced with a rapid manufacturing method, for example a 3-D printing method.

Optionally, a charging interface for wired charging of the respective battery cell 20 is also arranged below the cover 34.

The subject matter of the disclosure is not restricted to the exemplary embodiments described above. Rather, further exemplary embodiments of the disclosure can be derived from the above description by a person skilled in the art. In particular, the individual features of the disclosure described with reference to the various exemplary embodiments and the design variants thereof can also be combined with one another in a different way.

LIST OF REFERENCE NUMERALS

1 Binoculars
2 Optical group
4 Optical axis
6 Lens element
8 Prism
10 Partial housing body
12 Entrance opening
14 Exit opening
16 Eyepiece
18 Image stabilizer
20 Battery cell
22 Sheathing
24 Depression
26 Hinge bridge
28 Hinge
30 Adjustment mechanism
32 Cable connection
34 Cover

What is claimed is:

1. A portable optical observation device, comprising:
an optical group having a plurality of optical elements arranged along an optical axis;
a housing which surrounds the optical group at least radially around the optical axis and which includes a partial housing body, the partial housing body having an outer surface;
at least one electronic assembly arranged in the housing;
at least one planar battery cell arranged on the outer surface of the partial housing body and shaped against the outer surface of the partial housing body such that the at least one planar battery cell nestles against an external contour of the outer surface of the partial housing body; and
a sheathing arranged on the partial housing body,
wherein the at least one planar battery cell is covered by the sheathing,
wherein the sheathing is a protective sleeve, and
wherein the at least one planar battery cell is configured to be at least moisture resistant and to supply the at least one electronic assembly with power.

2. The portable optical observation device as claimed in claim 1, wherein the at least one planar battery cell is flexible.

3. The portable optical observation device as claimed in claim 1, wherein the at least one planar battery cell is washable.

4. The portable observation device as claimed in claim 1, wherein the housing has a flat and planar battery compartment radially introduced into the outside of the housing, and
wherein the at least one planar battery cell is arranged in the flat and planar battery compartment.

5. The portable optical observation device as claimed in claim 4, wherein the housing has a housing subcomponent, and
wherein the at least one planar battery cell is covered by the housing subcomponent.

6. The portable optical observation device as claimed in claim 5, wherein the housing subcomponent is formed with a rapid manufacturing method, and
wherein the rapid manufacturing method is selected from the group consisting of laser beam melting, laser beam sintering, laser beam build-up welding, electron beam melting, stereolithography, digital light processing, multi-jet modeling, fused deposition modeling, binder jetting, and cold spray.

7. The portable optical observation device as claimed in claim 5, wherein the housing subcomponent is held at the housing such that the housing subcomponent is reversibly openable and closable.

8. The portable optical observation device as claimed in claim 1, wherein the sheathing has a sheathing subcomponent, and wherein the at least one planar battery cell is covered by the sheathing subcomponent.

9. The portable optical observation device as claimed in claim 8, wherein the sheathing subcomponent is formed with a rapid manufacturing method, and wherein the rapid manufacturing method is selected from the group consisting of laser beam melting, laser beam sintering, laser beam build-up welding, electron beam melting, stereolithography, digital light processing, multi-jet modeling, fused deposition modeling, binder jetting, and cold spray.

10. The portable optical observation device as claimed in claim 8, wherein the sheathing subcomponent is held at the sheathing such that the sheathing subcomponent is reversibly openable and closable.

11. The portable optical observation device as claimed in claim 1, further comprising at least two of the battery cells for a redundant power supply of the electronic assembly.

12. The portable optical observation device as claimed in claim 1, wherein the portable optical observation device is embodied as binoculars.

13. The portable optical observation device as claimed in claim 12, wherein the electronic assembly is an image stabilizer.

14. The portable optical observation device as claimed in claim 1, wherein the sheathing enhances gripping the portable optical observation device.

* * * * *